United States Patent [19]

Schack

[11] 4,026,996
[45] May 31, 1977

[54] SYNTHESIS OF NITRYL PERCHLORATE

[75] Inventor: Carl J. Schack, Chatsworth, Calif.

[73] Assignee: Rockwell International Corporation, El Segundo, Calif.

[22] Filed: May 28, 1974

[21] Appl. No.: 474,130

[52] U.S. Cl. .............................................. 423/386
[51] Int. Cl.$^2$ ........................................ C01B 21/52
[58] Field of Search ............. 423/386, 476; 149/74, 149/75

[56] References Cited

UNITED STATES PATENTS

| | | | |
|---|---|---|---|
| 3,186,790 | 6/1965 | Brown et al. | 423/386 |
| 3,558,456 | 1/1971 | Lakritz | 423/386 X |

*Primary Examiner*—Earl C. Thomas
*Attorney, Agent, or Firm*—L. Lee Humphries; Robert M. Sperry

[57] ABSTRACT

An improved method of synthesizing nitryl perchlorate by oxidizing chlorine nitrate with ozone.

2 Claims, No Drawings

SYNTHESIS OF NITRYL PERCHLORATE

The invention herein described was made in the course of or under a contract or subcontract thereunder, (or grant) with the Department of the U.S. Navy.

BACKGROUND

1. Field of the Invention

This invention relates to solid oxidizers and is particularly directed to methods of producing nitryl perchlorate.

2. Prior Art

Nitryl perchlorate, $NO_2^+ClO_4^-$, has been known for many years as a powerful oxidizer. Heretofore, the conventional method of producing nitryl perchlorate has required the reaction of chlorine dioxide, $ClO_2$, with nitrogen dioxide, $NO_2$, and ozone, $O_3$. Unfortunately, chlorine dioxide, in either the gaseous or liquid state, tends to explode for no apparent reason. Consequently, any operation which involves chlorine dioxide is hazardous to people, buildings and equipment.

SUMMARY OF THE INVENTION

These disadvantages of the prior art are overcome with the present invention and an improved method of producing nitryl perchlorate is provided which eliminates the use of chlorine dioxide, with its attendant hazards, yet provides good yields and easy purification.

The advantages of the present invention are preferably attained by providing a method of producing nitryl perchlorate by reacting chlorine nitrate, $ClNO_3$, with ozone.

Accordingly, it is an object of the present invention to provide improved methods of producing oxidizers.

Another object of the present invention is to provide an improved method of producing nitryl perchlorate.

An additional object of the present invention is to provide a safer method of producing nitryl perchlorate.

A further object of the present invention is to provide a method of producing nitryl perchlorate without the use of chlorine dioxide.

A specific object of the present invention is to provide a method of producing nitryl perchlorate by reacting chlorine nitrate with ozone.

These and other objects and features of the present invention will be apparent from the following detailed description.

DETAILED DESCRIPTION OF INVENTION

In that form of the present invention chosen for illustration, a method of producing nitryl perchlorate is proposed which calls for reacting chlorine nitrate with ozone. It should be understood that, as used herein, the terms "nitryl perchlorate" and "nitronium perchlorate" are synonymous.

Chlorine nitrate is a liquid which boils at 22° C and is easily prepared, following the teachings of U.S. Pat. No. 3,472,635, assigned to the present assignee. Chlorine nitrate is not hazardous and is relatively insensitive to physical shock.

Although chlorine nitrate is well-known, the reaction of the present invention is unexpected. Conventionally, ClO—X compounds react with ozone to give chloryl species; such as $$ClOClO_3 + 2O_3 \rightarrow O_2ClOClO_3 + 2O_2 \quad (1)$$
$$ClSO_3F + 2O_3 \rightarrow O_2ClOSO_2F + 2O_2 \quad (2)$$

or it does not react at all, as in $$CF_3OCl + O_3 \rightarrow \text{No reaction} \quad (3)$$

The reaction of the present invention is $$ClONO_2 + O_3 \rightarrow NO_2^+ClO_4^- + 3O_2$$

This reaction has been observed to occur readily at temperatures as low as -78° C, in the presence of an inert fluorocarbon solvent, $CF_3Cl$, and at temperatures ranging from -45° C to ambient without a solvent. Conversions, using this method, have been as high as 89% and yields have been 100%. Moreover, the reactants, chlorine nitrate and ozone, and the by-product, oxygen, are gases; whereas the nitryl perchlorate is a solid. Consequently, purification is simple and the gases may be recovered and recycled.

EXAMPLE I

Chlorine nitrate (24.2 cm³, 1.08 mmol) and $CF_3Cl$ solvent (approximately 250 cm³), were condensed into a 30 ml. stainless steel cylinder cooled to -196° C in a liquid nitrogen bath. Following that, ozone (72.6 cm³, 3.24 mmol) was also condensed in at -196° C and the closed cylinder was warmed to and maintained at -45° C. After 42 hrs. the reaction cylinder was recooled to -196° C and the oxygen that had formed was measured (53.4 cm³, 2.38 mmol) and pumped away. On warming the reaction to room temperature, the remaining products were separated by fractional condensation in U-traps cooled to -78°, -112°, and -196° C. Unreacted chlorine nitrate (7.6 cm³, 0.34 mmol) was retained at -112° C. Unreacted ozone and the $CF_3Cl$ solvent were trapped at -196° C. There remained in the cylinder, the white solid, nitryl perchlorate (107 mg, 0.74 mmol) which was readily dentified by its infrared spectrum and comparison to an authentic sample. The conversion of $ClNO_3$ to $NO_2^+ClO_4^-$ was 68.6% and the yield of $NO_2^+ClO_4^-$ based on the material reacted was essentially quantitative.

EXAMPLE II

A 30-ml. stainless steel cylinder was loaded successively with $ClNO_3$(23.2 cm³, 1.03 mmol), $CF_3Cl$ (approximately 480 cm³), and $O_3$ (90.5 cm³, 4.04 mmol) by condensing them in at -196° C. The reaction was allowed to proceed at -45° C for 72 hrs. At that time the oxygen now present was measured (106 cm³, 4.73 mmol) and pumped away followed by all the other volatile materials. There remained in the cylinder the white solid $No_2^+ClO_4^-$ (133 mg, 0.92 mmol). The yield of nitryl perchlorate was 89%.

EXAMPLE III

Chlorine nitrate (16.4 cm³, 0.73 mmol) and ozone (61.6 cm³, 2.75 mmol) were separately condensed into a 30 ml. stainless steel cylinder cooled to -196° C in a liquid nitrogen bath. The cylinder was then kept at -45° C for 66 hrs. The products were separated by fractional condensation in a series of U-traps cooled to -78° C, -112°, and -196° C after removal of the by-product $O_2$ (49.2 cm³, 2.20 mmol). Unreacted chlorine nitrate (7.8 cm³, 0.35 mmol) and ozone (20.2 cm³, 0.90 mmol) were the only other volatile species found. The solid product nitryl perchlorate (57 mg, 0.39 mmol) remained in the cylinder and was identified by its infrared spectrum. The conversion of $ClNO_3$ to $NO_2^+ClO_4^-$ was 53% and the yield based on the converted material was nearly quantitative.

EXAMPLE IV

Chlorine nitrate (20.4 cm$^3$, 0.91 mmol), CF$_3$Cl (approximately 300 cm$^3$) and ozone (72.0 cm$^3$, 3.21 mmol) were condensed successively into a 30 ml. stainless steel cylinder cooled to -196° C. The closed cylinder was allowed to warm to ambient temperature, approximately 20° C, for 4 hours. The volatile materials were then pumped out of the cylinder leaving behind the white solid, nitryl perchlorate (111 mg, 0.76 mmol). The yield of NO$_2$+ClO$_4$− was 84%.

EXAMPLE V

A 30 ml stainless steel cylinder was charged with ClNO$_3$ (24.6 cm$^3$, 1.10 mmol), CF$_3$Cl (approximately 250 cm$^3$), and O$_3$ (85.2 cm$^3$, 3.80 mmol) by condensing them in at -196° C. The reaction was allowed to proceed at -78° C for 45 hours. By-product $_2$ (23.8 cm$^3$, 1.06 mmol) was then measured and removed. Other volatile species were separated by fractional condensation. Unreacted ClNO$_3$ (17.5 cm$^3$, 0.78 mmol) was recovered and the solid nitryl perchlorate formed was 45 mg, 0.31 mmol. The conversion of ClNO$_3$ to NO$_2$+ClO$_4$− was 28% and the yield based on the converted material was nearly quantitative.

Obviously, numerous variations and modifications may be made without departing from the present invention. Accordingly, it should be clearly understood that the forms of the present invention described above are illustrative only and are not intended to limit the scope of the present invention.

What is claimed is:

1. The method of synthesizing nitryl perchlorate comprising the step of:
   combining chlorine nitrate and ozone in the presence of an inert fluorocarbon solvent at a temperature in the range from about −78° C to about ambient.
2. The method of claim 1 wherein:
   said conbining step is performed in the presence of CF$_3$Cl.

* * * * *

UNITED STATES PATENT AND TRADEMARK OFFICE
CERTIFICATE OF CORRECTION

PATENT NO. : 4,026,996
DATED : May 31, 1977
INVENTOR(S) : Carl J. Schack

It is certified that error appears in the above-identified patent and that said Letters Patent are hereby corrected as shown below:

Column 2, line 7, delete "$ClONO_2 + \frac{}{3} \longrightarrow NO_2^+ClO_4^- + 3O_2$" and insert therefor --$ClONO_2 + 3O_3 \longrightarrow NO_2^+ClO_4^- + 3O_2$--.

Column 2, line 37, delete "dentified" and insert therefor --identified--

Column 4, line 20, delete "conbining" and insert therefor --combining--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*